US012747715B2

(12) United States Patent
Sakano et al.

(10) Patent No.: US 12,747,715 B2
(45) Date of Patent: Sep. 29, 2026

(54) INTAKE MANIFOLD

(71) Applicants: MAHLE Filter Systems Japan Corporation, Tokyo (JP); MAHLE International GmbH, Stuttgart (DE)

(72) Inventors: Ryota Sakano, Tokyo (JP); Akihito Toda, Tokyo (JP)

(73) Assignee: Mahle International GmbH (DE)

(*) Notice: Subject to any disclaimer, the term of this patent is extended or adjusted under 35 U.S.C. 154(b) by 0 days.

(21) Appl. No.: 18/988,840

(22) Filed: Dec. 19, 2024

(65) Prior Publication Data

US 2025/0207548 A1 Jun. 26, 2025

(30) Foreign Application Priority Data

Dec. 20, 2023 (JP) ................................ 2023-214453

(51) Int. Cl.
*F02B 25/06* (2006.01)
*F02M 25/06* (2016.01)
*F02M 35/10* (2006.01)

(52) U.S. Cl.
CPC ...... *F02M 35/10222* (2013.01); *F02M 25/06* (2013.01)

(58) Field of Classification Search
CPC ........... F02M 35/10222; F02M 35/112; F01M 13/00; F02B 27/0263
USPC .......................................................... 123/572
See application file for complete search history.

(56) References Cited

U.S. PATENT DOCUMENTS

| | | | | |
|---|---|---|---|---|
| 10,352,277 | B2 * | 7/2019 | Ito | F02M 26/20 |
| 10,731,607 | B2 * | 8/2020 | Sakurai | F02M 35/112 |
| 10,954,902 | B2 * | 3/2021 | Mizuta | F02M 35/10222 |
| 11,852,109 | B1 * | 12/2023 | Rundell | F02M 35/1036 |
| 2017/0211519 | A1 * | 7/2017 | Ito | F02M 35/10222 |
| 2019/0338736 | A1 * | 11/2019 | Ooki | F02M 35/112 |
| 2021/0172411 | A1 * | 6/2021 | Itagaki | F02M 26/44 |

FOREIGN PATENT DOCUMENTS

JP 2004060488 A 2/2004

* cited by examiner

*Primary Examiner* — Logan M Kraft
*Assistant Examiner* — James J Kim
(74) *Attorney, Agent, or Firm* — Fishman Stewart PLLC

(57) ABSTRACT

An air intake manifold may include an air intake tube that communicates with a plurality of cylinders of an internal combustion engine and a blow-by gas passage that guides blow-by gases of a crankcase of the internal combustion engine to the air intake tube. The air intake tube may include an intake air guide-in part into which intake air is guided, a plurality of branch tubes, a mounting part, and a valve disposed inside the branch tubes. The blow-by gas passage may include a blow-by gas guide-in part into which the blow-by gases are guided, a blow-by gas guide-out part, a blow-by gas flow path part disposed between the blow-by gas guide-in part and the blow-by gas guide-out part, and a connecting passage part that branches from the blow-by gas flow path part and connects to the branch tubes at a position of the blow-by gas guide-out part.

20 Claims, 3 Drawing Sheets

INTAKE MANIFOLD

CROSS-REFERENCE TO RELATED APPLICATION

This application claims priority to Japanese Patent Application No. JP 2023-214453, filed on Dec. 20, 2023, the contents of which is hereby incorporated by reference in its entirety.

TECHNICAL FIELD

The present invention relates to an air intake manifold.

BACKGROUND

Generally, a blow-by gas recirculation system is known that guides gases that blow through the gap between the cylinder and piston of an internal combustion engine (engine) installed in a vehicle back through the air intake manifold to the engine for re-combustion (see, for instance, patent document 1).

Patent document 1: Japanese Unexamined Patent Application Publication No. 2004-060488

SUMMARY

In engines equipped with a blow-by gas recirculation system, when moisture contained in the blow-by gases condenses and reaches the airflow control valve located between the air intake manifold and the engine cylinder, there is a possibility that the valve part of the airflow control valve may become stuck due to freezing of the moisture. In particular, the tumble control valve (TCV), whose valve part is circular arc-shaped and oscillates to open/close like a swing around a rotary shaft, has a large area of the valve part opposing the inner surface of the air intake tube of the air intake manifold, making it prone to freezing and sticking to the opening part. Therefore, in engines having a blow-by gas recirculation system, there has been a requirement to remove moisture from inside the air intake tube of the air intake manifold.

Therefore, the present invention was made in view of the above problem, and it is an object of the present invention to provide an air intake manifold that can suppress the inflow of moisture contained in blow-by gases into the airflow control valve.

To solve the above problem, the air intake manifold according to the present invention comprises an air intake tube that communicates with a plurality of cylinders in an internal combustion engine installed in a vehicle, and a blow-by gas passage that guides blow-by gases generated inside the crankcase of the internal combustion engine to the air intake tube, wherein the air intake tube comprises: an intake air guide-in part into which intake air is guided, having an air intake passage inside; a plurality of branch tubes, disposed on the downstream side of the intake air guide-in part, that distribute the intake air and supply it to each of the plurality of cylinders; a mounting part, disposed on the downstream side of the branch tubes, that is mounted on the main body side of the internal combustion engine and links the air intake passage to each cylinder; and a valve disposed inside the branch tubes in the vicinity of the mounting part; wherein the blow-by gas passage comprises: a blow-by gas guide-in part into which the blow-by gases are guided; a blow-by gas guide-out part, disposed further to the intake air guide-in part side in the planar direction than a apex part, which is the highest position of the branch tubes in the vehicle height direction in a state where the internal combustion engine has been installed in the vehicle; a blow-by gas flow path part disposed between the blow-by gas guide-in part and the blow-by gas guide-out part and connected to the blow-by gas guide-in part; and a connecting passage part that branches from the blow-by gas flow path part, extends to the branch tubes, and connects to the branch tubes at the position of the blow-by gas guide-out part.

In the air intake manifold according to one aspect of the present invention, the blow-by gas flow path part extends substantially in parallel to the direction in which the plurality of branch tubes are arrayed, and is disposed at a higher position than the blow-by gas guide-out part in the vehicle height direction and is disposed further to the mounting part side in the planar direction than the apex part.

In the air intake manifold according to one aspect of the present invention, the connecting passage part is disposed on the downward side of the blow-by gas flow path part in the vehicle height direction.

In the air intake manifold according to one aspect of the present invention, the valve is designed such that a valve element formed in a circular arc shape rotates in a circular arc shape relative to a rotary shaft with a slight clearance from an inner surface formed in a circular arc shape inside the branch tubes.

According to the present invention, it is possible to suppress the inflow of moisture contained in blow-by gases into the airflow control valve.

DETAILED DESCRIPTION

Below, an embodiment of the present invention will be presented with reference to the drawings.

Figure 1:
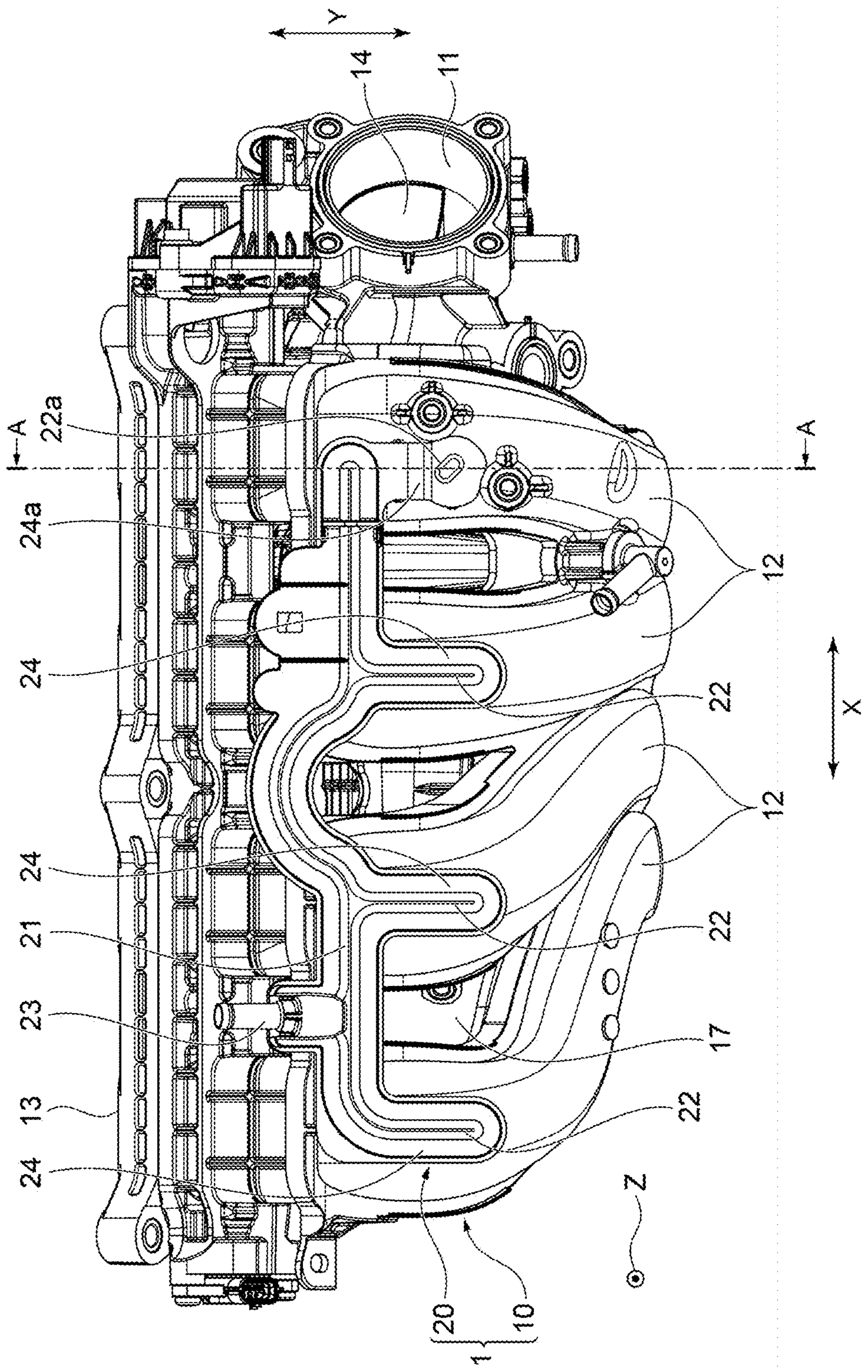
FIG. 1 is a plan view illustrating an air intake manifold of an internal combustion engine according to an embodiment of the present invention.
Figure 2:
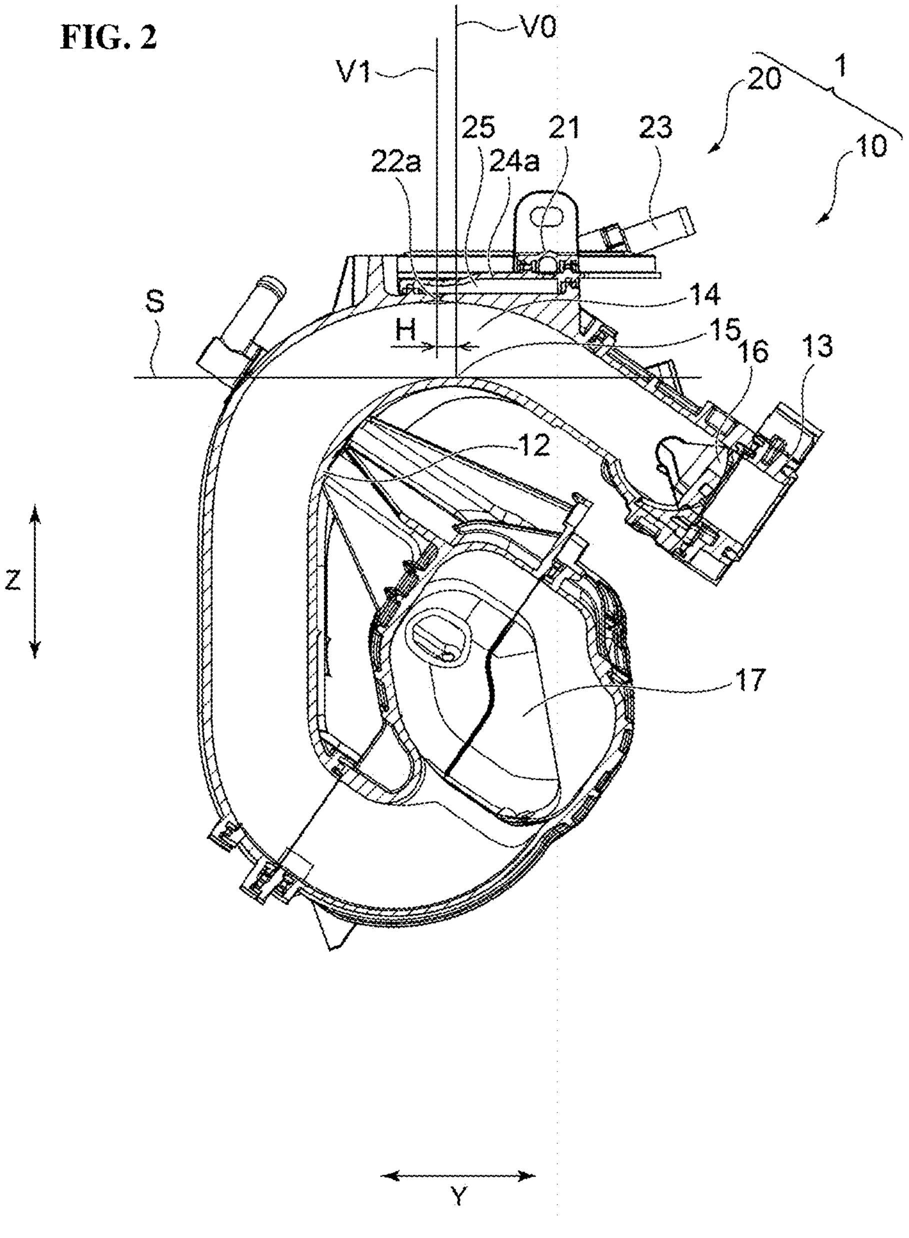
FIG. 2 is a cross-sectional view illustrating the air intake manifold according to the embodiment.
Figure 3:
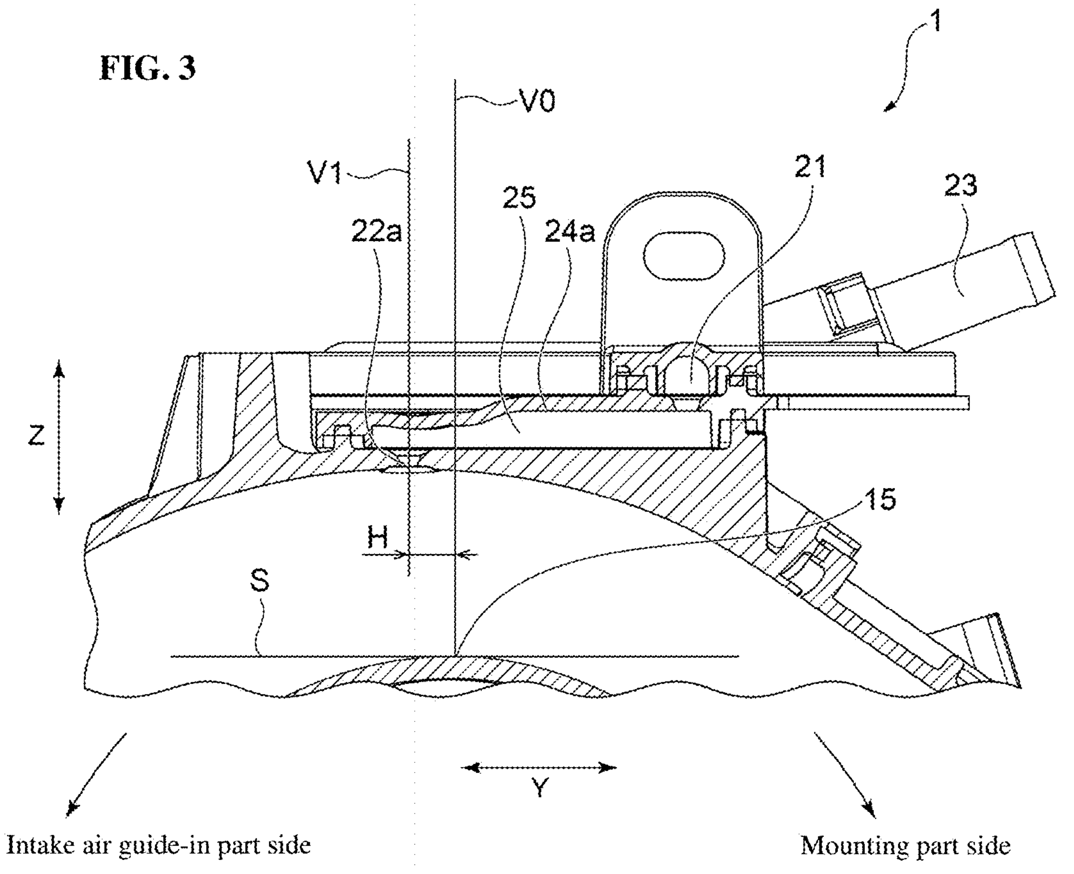
FIG. 3 is an enlarged cross-sectional view illustrating the air intake manifold according to the embodiment.

FIG. 1 is a plan view illustrating the air intake manifold 1 of an internal combustion engine according to an embodiment of the present invention. FIG. 2 is an A-A cross-sectional view of the air intake manifold 1. FIG. 3 is an enlarged cross-sectional view of the air intake manifold 1.

As shown in FIG. 1 to FIG. 3, the air intake manifold 1 is applied to an air intake manifold of a 4-cylinder internal combustion engine (engine) for an automobile, which is an example of a vehicle. The engine is installed in the engine compartment, for example, in a transverse mount oriented in the vehicle width direction (x-axis direction).

As shown in FIG. 2 and FIG. 3, the air intake manifold 1 has the mounting surface of the mounting part 13 inclined in accordance with the incline of the mounting surface on the engine side, and the air intake tube 10 extends upward from the mounting part 13 and then extends downward, forming a coiled shape when viewed from the cross-sectional direction as shown in FIG. 2. In the state where it is mounted on the engine, the air intake manifold 1 has the blow-by gas passage 20 disposed on the upper side in the vicinity of the apex of the air intake tube 10.

In the following, for expediency of description, the left-right direction shall refer to the vehicle width direction, the front-back direction refers to the direction of travel, and the vertical direction to the vehicle height direction. When describing the physical position relationships and directions of component parts as right side, left side, front side, rear side, upward side, and downward side in the following description, these strictly indicate the position relationship and direction in the drawings and do not limit the actual position relationships and directions in the air intake manifold 1.

As shown in FIG. 1, the air intake manifold 1 installed in the vehicle comprises an air intake tube 10 that communicates with a plurality of cylinders, and a blow-by gas passage 20 that recirculates blow-by gases generated inside the crankcase of the internal combustion engine from inside the crankcase to the air intake tube 10. The air intake tube 10 comprises an intake air guide-in part 11, branch tubes 12, and a mounting part 13. The air intake tube 10 has an air intake passage 14 inside, into which intake air is guided. The plurality of branch tubes 12 are disposed on the downstream side of the intake air guide-in part 11 and distribute and supply the intake air to each of the plurality of cylinders. The mounting part 13 connects to the engine's cylinder head, and the air intake passage 14 inside each branch tube 12 connects to each of the plurality of cylinders. The blow-by gas passage 20 comprises a blow-by gas flow path part 21, blow-by gas guide-out part 22, 22*a*, and a blow-by gas guide-in part 23. From the blow-by gas guide-in part 23, blow-by gases are guided into the blow-by gas flow path part 21. As shown in FIG. 2 and FIG. 3, the blow-by gas guide-out part 22, 22*a* is disposed further to the intake air guide-in part 11 side in the planar direction than the apex part 15, which is the highest position of the branch tubes 12 in the vehicle height direction in a state where the internal combustion engine is installed in the vehicle, and discharge the blow-by gases into the air intake passage 14 inside the branch tubes 12. The blow-by gas flow path part 21 serves as a passage connecting the blow-by gas guide-in part 23 and the blow-by gas guide-out part 22, 22*a*.

The blow-by gas flow path part 21 extends in the direction in which the branch tubes 12 are arrayed as shown in FIG. 1, and as shown in FIG. 2, is installed at a position higher than the blow-by gas guide-out part 22, 22*a* in the vehicle height direction.

As shown in FIG. 1, between the blow-by gas flow path part 21, which extends in the direction in which the branch tubes 12 are arrayed, and the blow-by gas guide-out part 22, 22*a*, there is formed a connecting passage part 24, 24*a*, extending from the direction of extension of the flow path part to a substantially orthogonal direction.

As shown in FIG. 2 and FIG. 3, the blow-by gas guide-in part 23 is disposed further to the mounting part 13 side in the planar direction than the apex part 15, and the blow-by gas flow path part 21 is arranged further to the mounting part 13 side in the planar direction than the apex part 15.

The air intake tube 10, inside the air intake passage 14 in the vicinity of the mounting part 13 of the branch tubes 12, comprises a tumble control valve 16 as a valve part that allows opening and closing of at least a portion of the passage cross-sectional area of the air intake passage 14 (details described later).

Below, the air intake tube 10 and blow-by gas passage 20 that constitute the air intake manifold 1 according to this present embodiment will be described concretely.

It should be noted that in the air intake manifold 1, the intake air flowing through the air intake passage 14 inside the air intake tube 10 flows from the intake air guide-in part 11 toward the mounting part 13. Therefore, the flow direction in the air intake tube 10 is the direction from the upstream side intake air guide-in part 11 toward the downstream side mounting part 13. Also, in the air intake manifold 1, the blow-by gases flowing through the gas passage of the blow-by gas passage 20 flow from the blow-by gas guide-in part 23 toward the blow-by gas guide-out part 22, 22*a*. Therefore, the flow direction in the blow-by gas passage 20 is the direction from the upstream side blow-by gas guide-in part 23 toward the downstream side blow-by gas guide-out part 22, 22*a*.

In addition to the above-described intake air guide-in part 11, branch tubes 12, and mounting part 13, the air intake tube 10 also comprises a surge tank 17, etc. The branch tubes 12 are, for instance, tubular components having a space that forms the air intake passage 14 inside. All components of the air intake tube 10 described above constitute a plurality of parts molded from resin, for example.

The intake air guide-in part 11 is an opening part that establishes communication between the interior and exterior of the air intake passage 14. The intake air guide-in part 11 connects to an unillustrated throttle chamber, air cleaner, etc.

The surge tank 17 is disposed on the engine side (downstream side) of the intake air guide-in part 11 and on the air cleaner side (upstream side) of the branch tubes 12. The surge tank 17 branches the air intake passage 14 from one space communicating with the intake air guide-in part 11 into a plurality of branch tubes 12 corresponding to the number of cylinders. In this present embodiment, it branches into four branch tubes 12.

The branch tubes 12 are disposed downstream of the surge tank 17 and upstream of the mounting part 13. As shown in FIG. 2, each of the branch tubes 12 extends from the downward side of the surge tank 17 and curves to surround the surge tank 17 from the rear side, connecting to the mounting part 13 positioned on the upper side of the surge tank 17.

The mounting part 13 is on the downstream side of the branch tubes 12, and is installed side surface of the engine's cylinder head on the air intake side where four air intake ports open for each of the cylinders, with opening parts formed that connect to each cylinder. Through the mounting part 13, intake air is supplied to each of the plurality of cylinders corresponding to the respective air intake port. The mounting part 13 is has four air intake passages 14, formed side by side in the cylinder row direction, that connect to and communicate with the respective air intake ports. As shown in FIG. 2, the tumble control valve 16 is installed in the air intake passage 14 on the mounting part 13 side.

The tumble control valve 16 is installed inside the branch tubes 12 in the vicinity of the mounting part 13. The tumble control valve 16 has a rotary shaft extending in the cylinder row direction to intersect the four air intake passages 14 in the cylinder row direction, and four valve elements installed on this rotary shaft that open and close the air intake passages 14 with the rotation of the rotary shaft. The tumble control valve 16 allows opening and closing of at least a portion of the passage cross-sectional area of the air intake passages 14. As shown in FIG. 2, the tumble control valve 16 has a valve element formed in a circular arc shape relative to the rotary shaft. The inner surface of the air intake passage 14 inside the branch tube 12 opposing the valve element is similarly formed in a circular arc shape. The valve element is arranged to be able to rotate at a slight gap between the two.

The blow-by gas passage 20 comprises, as described above, the blow-by gas flow path part 21, blow-by gas guide-out part 22, 22*a*, blow-by gas guide-in part 23, and connecting passage part 24, 24*a*. The blow-by gas passage 20 is formed by bonding multiple components, all made of resin, for example. The blow-by gas passage 20 has a space that forms the gas passage 25 inside.

The blow-by gas guide-in part 23 communicates with an unillustrated blow-by gas source to guide blow-by gases from the blow-by gas source into the interior of the blow-by gas flow path part 21.

The blow-by gas flow path part 21 is a passage that communicates between the blow-by gas guide-in part 23 and multiple blow-by gas guide-out parts 22, 22*a*. The blow-by gas flow path part 21 is arranged so that the direction in which the multiple branch tubes 12 are arrayed, namely the left-right direction (x-axis direction), becomes its long direction. The blow-by gas flow path part 21 is formed in a straight pipe-shaped or substantially straight pipe-shaped form. The blow-by gas flow path part 21 is installed at a position higher than the blow-by gas guide-out parts 22, 22*a* in the vehicle height direction. Also, the blow-by gas flow path part 21 is disposed at a different position from the apex part 15 and blow-by gas guide-out parts 22, 22*a* in the planar direction, namely the vehicle's direction of travel (y-axis direction), specifically on the mounting part 13 side toward the rear side of the vehicle.

The blow-by gas guide-out parts 22, 22*a* are disposed, for example, as four parts corresponding to the number of engine cylinders. The blow-by gas guide-out parts 22, 22*a* are disposed on the downstream side of the blow-by gas flow path part 21. As shown in FIG. 2 and FIG. 3, the blow-by gas guide-out parts 22, 22*a* are disposed slightly toward the intake air guide-in part 11 side in the planar direction (y-axis direction) than the apex part 15, specifically such that the vertical line V1 passing through the center of the blow-by gas guide-out parts 22, 22*a* is offset by a distance H in the horizontal direction relative to the vertical line V0 passing through the apex part 15, perpendicular to the horizontal tangent line S passing through the apex part 15 on the downward side of the inner surface of the branch tubes 12.

The connecting passage parts 24, 24*a* are disposed between the blow-by gas guide-out parts 22, 22*a* and the blow-by gas flow path part 21 in the flow direction of the blow-by gases. For instance, four connecting passage parts 24, 24*a* are provided, corresponding to the number of blow-by gas guide-out parts 22, 22*a*. The connecting passage parts 24, 24*a* form a gas passage 25 between the blow-by gas guide-out parts 22, 22*a* and the blow-by gas flow path part 21. Among the four connecting passage parts 24, 24*a*, in the present embodiment, one connecting passage part 24*a* is disposed at a lower position on the downward side of the blow-by gas flow path part 21 in the vehicle height direction, as shown in FIG. 2 and FIG. 3. The blow-by gas guide-out parts 22, 22*a* communicate with the blow-by gas guide-in part 23 via the connecting passage parts 24, 24*a* and the blow-by gas flow path part 21. Furthermore, the blow-by gas guide-out parts 22, 22*a* communicate with the air intake passage 14 of the branch tubes 12 through openings provided in the branch tubes 12. Therefore, the blow-by gas guide-out parts 22, 22*a* can discharge blow-by gases to each of the branch tubes 12 from the blow-by gas flow path part 21.

Next, the function of the above-described air intake manifold 1 described above will be described.

In the air intake manifold 1, the blow-by gas guide-out parts 22, 22*a* of the blow-by gas passage 20 are disposed further to the intake air guide-in part 11 side in the planar direction than the apex part 15, which is the highest position of the branch tubes 12 in the vehicle height direction in a state where the internal combustion engine has been installed in the vehicle.

In the air intake manifold 1, as shown in FIG. 2 and FIG. 3, by disposing the blow-by gas guide-out part 22, 22*a* at a position offset in one direction from the apex part 15 of the air intake passage 14 of the branch tube 12 which is wound in a circular arc shape or substantially circular arc shape, specifically, toward the intake air guide-in part 11 side which is opposite to the mounting part 13 side where the tumble control valve 16 is disposed, the moisture contained in the blow-by gases flows to the intake air guide-in part 11 side rather than the mounting part 13 side. In other words, with the air intake manifold 1, the condensed water from the blow-by gases can be brought down to the portion extending vertically in a straight line below the blow-by gas guide-out part 22, 22*a*, thereby reliably preventing moisture from adhering to the tumble control valve 16 and the valve from becoming stuck.

In the air intake manifold 1, by providing the connecting passage part 24*a* at a position lower than the blow-by gas flow path part 21 in the vehicle height direction, the blow-by gas passage 20 can more easily drain the condensed water from the blow-by gases to the blow-by gas guide-out part. Furthermore, by reducing the dimension in the height direction of the air intake manifold 1 over the connecting passage part 24*a*, the layout efficiency of components above can be improved.

While an embodiment of the present invention has been described above, the present invention is not limited to the above embodiment and includes all aspects encompassed by the concept and scope of patent claims of the present invention. Furthermore, components may be selectively combined as appropriate to address at least a portion of the problem to be solved and achieve the effect described above. For example, the shape, material, arrangement, size, etc. of each component in the above embodiment can be modified as appropriate according to the specific manner of use of the present invention.

For instance, while the air intake manifold 1 was described using an example of use with a 4-cylinder engine, the present invention is not limited by the number of engine cylinders. Therefore, in the air intake manifold 1, the number of branch tubes 12, connecting passage parts 24, 24*a*, and blow-by gas guide-out parts 22, 22*a* can be set according to the number of cylinders of the engine to which it is to be applied.

For instance, in the air intake manifold 1, the shapes of the air intake tube 10 and the blow-by gas passage 20 are not limited to the examples described above.

For instance, while the air intake manifold 1 was described using an example where the air intake tube 10 and blow-by gas passage 20 were made of resin, the materials and molding method for the air intake tube 10 and blow-by gas passage 20 are not limited to the examples described above.

For example, while in the air intake manifold 1, among the four connecting passage parts 24, 24*a*, only one connecting passage part 24*a* was disposed at a position lower than the blow-by gas flow path part 21 in the vehicle height direction, the number of connecting passage parts 24*a* disposed lower than the blow-by gas flow path part 21 is not particularly limited.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both elements, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the phrase at least one of successive elements separated by the word "and" (e.g., "at least one of A and B") is to be interpreted the same as the term "and/of" and as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

The invention claimed is:

1. An air intake manifold, comprising an air intake tube that communicates with a plurality of cylinders of an internal combustion engine installed in a vehicle, and a blow-by gas passage that guides blow-by gases of a crankcase of the internal combustion engine to the air intake tube, wherein:

the air intake tube includes:

an internal air intake passage;

an intake air guide-in part into which intake air is guided;

a plurality of branch tubes disposed on a downstream side of the intake air guide-in part, the plurality of branch tubes distributing the intake air and supplying the intake air to each of the plurality of cylinders;

a mounting part disposed on a downstream side of the plurality of branch tubes, the mounting part mounted on a main body side of the internal combustion engine and linking the air intake passage to each cylinder of the plurality of cylinders; and a valve disposed inside the plurality of branch tubes in a vicinity of the mounting part;

the blow-by gas passage includes:

a blow-by gas guide-in part into which the blow-by gases are guided;

a blow-by gas guide-out part disposed further to an intake air guide-in part side in a planar direction than an apex part, which is a highest position of the plurality of branch tubes in a vehicle height direction in a state where the internal combustion engine has been installed in the vehicle;

a blow-by gas flow path part disposed between the blow-by gas guide-in part and the blow-by gas guide-out part and connected to the blow-by gas guide-in part; and a connecting passage part that branches from the blow-by gas flow path part, extends to the plurality of branch tubes, and connects to the plurality of branch tubes at a position of the blow-by gas guide-out part; and the blow-by gas flow path part is disposed closer to the mounting plate in the planar direction than the apex part.

2. The air intake manifold according to claim 1, wherein the blow-by gas flow path part extends substantially parallel to a direction in which the plurality of branch tubes are arrayed and is disposed at a higher position than the blow-by gas guide-out part in the vehicle height direction.

3. The air intake manifold according to claim 2, wherein the connecting passage part is disposed on a downward side of the blow-by gas flow path part in the vehicle height direction.

4. The air intake manifold according to claim 3, wherein the valve includes a rotary shaft and a valve element having a circular arc shape, the valve element rotatable in a circular arc shape relative to the rotary shaft with a slight clearance from an inner surface formed in a circular arc shape inside the plurality of branch tubes.

5. The air intake manifold according to claim 2, wherein the valve includes a rotary shaft and a valve element having a circular arc shape, the valve element rotatable in a circular arc shape relative to the rotary shaft with a slight clearance from an inner surface formed in a circular arc shape inside the plurality of branch tubes.

6. The air intake manifold according to claim 1, wherein the valve includes a rotary shaft and a valve element having a circular arc shape, the valve element rotatable in a circular arc shape relative to the rotary shaft with a slight clearance from an inner surface formed in a circular arc shape inside the plurality of branch tubes.

7. The air intake manifold according to claim 1, wherein a longitudinal extent of the connecting passage part extends transversely to the vehicle height direction.

8. The air intake manifold according to claim 7, wherein the longitudinal extent of the connecting passage part extends perpendicularly to the vehicle height direction.

9. The air intake manifold according to claim 1, wherein:

the connecting passage part includes a plurality of connecting passage parts each branching off from the blow-by gas flow path part and connected to a respective branch tube of the plurality of branch tubes; and a first connecting passage part of the plurality of connecting passage parts is offset in the vehicle height direction from a second connecting passage part of the plurality of connecting passage parts.

10. The air intake manifold according to claim 1, wherein the blow-by gas flow path part and the blow-by gas guide-out part are in fluid communication with one another via a gas passage that is defined by and between the connecting passage part and the air intake tube.

11. The air intake manifold according to claim 1, wherein:

the connecting passage part includes a plurality of connecting passage parts each branching off from the blow-by gas flow path part and connected to a respective branch tube of the plurality of branch tubes; and at least one connecting passage part of the plurality of connecting passage parts includes:

a first longitudinal end;

a second longitudinal end;

an upper wall extending from the first longitudinal end to the second longitudinal end; and an opening disposed in the upper wall via which the respective connecting passage part is in fluid communication with the blow-by gas flow path part.

12. An air intake manifold, comprising:

an air intake tube configured to communicate with a plurality of cylinders of an internal combustion engine of a vehicle, the air intake tube including:

an air intake passage through which intake air is flowable;

an intake air guide-in part via which the intake air is flowable into the air intake passage;

a plurality of branch tubes disposed downstream of the intake air guide-in part via which the intake air is distributable and suppliable to each of the plurality of cylinders, the plurality of branch tubes each defining a respective portion of the air intake passage;

a mounting part via which the air intake passage is linkable to each cylinder of the plurality of cylinders, the mounting part disposed downstream of the plurality of branch tubes and mountable on a main body side of the internal combustion engine; and a valve disposed inside the plurality of branch tubes adjacent to the mounting part;

a blow-by gas passage via which blow-by gases of a crankcase of the internal combustion engine are guidable to the air intake tube, the blow-by gas passage including:

a blow-by gas guide-in part through which the blow-by gases are guidable;

a blow-by gas flow path part connected to the blow-by gas guide-in part;

a plurality of connecting passage parts each branching off from the blow-by gas flow path part and connected to a respective branch tube of the plurality of branch tubes; and a plurality of blow-by gas guide-out parts each connected to a respective branch tube of the plurality of branch tubes at a position adjacent to a free end of the connecting passage part connected to the respective branch tube, the plurality of connecting passage parts each in fluid communication with the portion of the air intake passage defined by the respective branch tube connected thereto via a respective blow-by gas guide-out part of the plurality of blow-by gas guide-out parts;

wherein an apex part, which is a highest position of the plurality of branch tubes in a vehicle height direction, is arranged between the plurality of blow-by gas guide-out parts and the mounting part relative to a planar direction extending perpendicular to the vehicle height direction; and the plurality of blow-by gas guide-out parts are arranged at a higher position than the apex part in the vehicle height direction.

13. The air intake manifold according to claim 12, wherein a longitudinal extent of each of the plurality of connecting passage parts extends transversely to the vehicle height direction.

14. The air intake manifold according to claim 12, wherein:

a longitudinal extent of the blow-by gas flow path part extends transversely to the vehicle height direction; and a longitudinal extent of each of the plurality of connecting passage parts extends transversely to the vehicle height direction and transversely to the longitudinal extent of the blow-by gas flow path part.

15. The air intake manifold according to claim 12, wherein a connecting passage part of the plurality of connecting passage parts disposed farthest from the blow-by gas guide-in part is offset in the vehicle height direction from at least one other connecting passage part of the plurality of connecting passage parts.

16. The air intake manifold according to claim 12, wherein:

at least one connecting passage part of the plurality of connecting passage parts is connected to the respective branch tube such that a gas passage is defined by and between the respective connecting passage part and the respective branch tube; and the blow-by gas flow path part and one of the plurality of blow-by gas guide-out parts are in fluid communication with one another via the gas passage.

17. The air intake manifold according to claim 12, wherein at least one connecting passage part of the plurality of connecting passage parts includes:

a first longitudinal end;

a second longitudinal end;

an upper wall extending from the first longitudinal end to the second longitudinal end; and an opening disposed in the upper wall via which the respective connecting passage part is in fluid communication with the blow-by gas flow path part.

18. An air intake manifold, comprising:

an air intake tube configured to communicate with a plurality of cylinders of an internal combustion engine of a vehicle, the air intake tube including:

an air intake passage through which intake air is flowable;

an intake air guide-in part via which the intake air is flowable into the air intake passage;

a plurality of branch tubes disposed downstream of the intake air guide-in part via which the intake air is distributable and suppliable to each of the plurality of cylinders, the plurality of branch tubes each defining a respective portion of the air intake passage;

a mounting part via which the air intake passage is linkable to each cylinder of the plurality of cylinders, the mounting part disposed downstream of the plurality of branch tubes and mountable on a main body side of the internal combustion engine; and a valve disposed inside the plurality of branch tubes adjacent to the mounting part;

a blow-by gas passage via which blow-by gases of a crankcase of the internal combustion engine are guidable to the air intake tube, the blow-by gas passage arranged on an upper side of the air intake tube relative to a vehicle height direction, the blow-by gas passage including:

a blow-by gas guide-in part through which the blow-by gases are guidable;

a blow-by gas flow path part connected to the blow-by gas guide-in part;

a plurality of connecting passage parts each branching off from the blow-by gas flow path part and connected to a respective branch tube of the plurality of branch tubes, the plurality of connecting passage parts each having a longitudinal extent extending transversely to the vehicle height direction; and a plurality of blow-by gas guide-out parts each connected to a respective branch tube of the plurality of branch tubes at a position adjacent to a free end of the connecting passage part connected to the respective branch tube, the plurality of connecting passage parts each in fluid communication with the portion of the air intake passage defined by the respective branch tube connected thereto via a respective blow-by gas guide-out part of the plurality of blow-by gas guide-out parts;

wherein an apex part, which is a highest position of the plurality of branch tubes in the vehicle height direction, is arranged between the plurality of blow-by gas guide-out parts and the mounting part relative to a planar direction extending perpendicular to the vehicle height direction.

19. The air intake manifold according to claim 18, wherein:

at least one of the plurality of connecting passage parts is disposed below the blow-by gas flow path part in the vehicle height direction; and the plurality of blow-by gas guide-out parts are each disposed below an associated connecting passage part of the plurality of connecting passage parts in the vehicle height direction.

20. The air intake manifold according to claim 18, wherein:

the plurality of connecting passage parts includes a first connecting passage part and a second connecting passage part;

the first connecting passage part is offset in the vehicle height direction from i) the second connecting passage part and ii) the blow-by gas flow path part; and the second connecting passage part is not offset in the vehicle height direction from the blow-by gas flow path part.

* * * * *